Patented Jan. 5, 1954

2,665,208

UNITED STATES PATENT OFFICE 2,665,208

MANUFACTURE OF FOODSTUFFS

Louis Spieser, Zurich, Switzerland, assignor to Nibbit Products Association Ltd., Zurich, Switzerland No Drawing. Application June 16, 1951, Serial No. 232,069

3 Claims. (Cl. 99—1)

It is already known to produce foodstuffs from starch-containing tubers, especially from potatoes, by subjecting the peeled tubers to a treatment in which a part of the starch is gelatinised and a part of the starch-cells bursts, working the material so obtained into uniform mass, transforming said mass under normal pressure and at a temperature below the boiling point of water, into a form suitable for uniform drying, frying the product shortly and intensely, and drying it to a small moisture content.

A further proposal to produce such products consists in transforming fresh potatoes into a watery mash by cooking, adding to said mash a powder consisting essentially of starch in form of potato flour, bringing the mixture into a form which is suitable for rapid and uniform drying, and then frying and drying this product.

Both processes use a relatively humid, flowable material which requires comparatively long frying times of 10–20 minutes, whereby the fried food must be dried subsequently. The heat consumption, therefore, is comparatively high and one has to fry twice, which again causes a high consumption of frying-oil.

The present invention provides an improved process for producing foodstuffs from starch-containing tubers which is characterised by preparing from fresh tubers which have been stewed without addition of water, and from dry powder substantially consisting of starch, a mixture which is as dry as possible and has a water content not surpassing 35%, pressing said mixture into a tough to hard mass which is then formed, for example by cutting it into pieces which are fried in oil during a short time.

During the frying process, the mass increases in volume to at least twice its original volume and due to its porous structure it is beneficial and readily digestible. On reheating, the product recovers its original crispiness, and it may also be consumed in hot state.

Before pressing, the mass may be admixed with seasoning products like salt or other condiments. Preferably the mass is pressed until it contains 10–12% of water.

Example 35 kgs. of fresh tubers, for example potatoes, are stewed without addition of water and worked into a homogeneous mass with 65 kgs. of a powder consisting essentially of starch. This mass is pressed and contains then about 11% of water. It then is cut into bands and fried in hot oil for a period of 10–13 seconds, whereby its volume is increased from two- to fourfold. Subsequent drying of the product is not necessary.

Due to the fact that in this process the pre-drying and subsequent drying steps are eliminated and the frying period is very short, the heat consumption is much lower than in the known processes so that it is more economical and, moreover, works faster, i. e., it is possible to speed up production with a consequent better utilisation of the equipment.

In accordance with the present invention there has been provided a method of producing a foodstuff comprising cooking an edible starch-containing tuber without the addition of water, mixing the cooked product with an edible powder consisting essentially of starch while keeping the water-content of the resulting homogeneous mixture not greater than about 35%, pressing said mixture to extract a portion of its water-content, and forming a tough cuttable mass, subdividing said pressed mass into smaller units, and then frying the latter for a short period of time, as, for example, 10 to 13 seconds.

In the preferred form of the invention the tuber-starch mixture is pressed until the water content of the mixture is about 10% to about 12%. Satisfactory results are obtained when about 30 to 35 parts thereof by weight are cooked without the addition of water and there is mixed with the cooked product about 70 to about 65 parts by weight of a dry edible powder consisting essentially of starch.

I claim:

1. The method of producing a foodstuff comprising cooking an edible starch-containing tuber without the addition of water, mixing about 30 to about 35 parts by weight of the cooked product with about 70 to about 65 parts by weight of a dry edible powder consisting essentially of starch while keeping the water-content of the resulting homogeneous mixture not greater than 35%, pressing said mixture until the water content of the mixture is between about 10% and about 12% to form a tough cuttable mass, subdividing said pressed mass into smaller units, and frying the latter for a short period of time and producing porous expanded units.

2. The method defined in claim 1 in which the subdivided units are fried for a period of time between the limits of about 10 seconds and about 13 seconds.

3. The method of producing a foodstuff comprising cooking an edible starch-containing tuber without the addition of water, mixing about 30 to about 35 parts by weight of the cooked product with about 70 to about 65 parts by weight of a dry edible powder consisting essentially of starch while keeping the water-content of the resulting homogeneous mixture not greater than 35%, pressing said mixture until the water content of the mixture is between about 10% and about 12% to form a tough cuttable mass, subdividing said pressed mass into smaller units, and converting said units into a porous expanded structure having a volume at least twice the original volume of said units, said conversion being effected by frying said units for a short period of time.

LOUIS SPIESER.

References Cited in the file of this patent

UNITED STATES PATENTS

| Number | Name | Date |
|---|---|---|
| 1,718,211 | Baker | June 25, 1929 |
| 2,160,902 | Raymond | June 6, 1939 |
| 2,352,670 | Volpertas | July 4, 1944 |
| 2,381,838 | Rendle | Aug. 7, 1945 |
| 2,469,995 | Schaul | May 10, 1949 |
| 2,498,024 | Baxter | Feb. 21, 1950 |
| 2,520,891 | Rivoche | Aug. 29, 1950 |
| 2,630,391 | Templeton | Mar. 3, 1953 |

OTHER REFERENCES

"Everybody's Cook Book" (1937), by I. E. Lord, published by Harcourt, Brace & Co., New York, page 22.

UNITED STATES PATENT OFFICE

Certificate

Patent No. 2,665,208                                                                    Patented January 5, 1954

LOUIS SPIESER

Application having been jointly made by Louis Spieser, the inventor named in the above identified patent, Nibbit Products Association Ltd., Zurich, Switzerland, the assignee, and Dirk R. d'Arnaud Gerkens, of Jachthuis Liesbos, Breda, The Netherlands, the said Louis Spieser and Dirk R. d'Arnaud Gerkens being assignors to the said Nibbit Products Association Ltd., for the issuance of a certificate under the provisions of Title 35, Section 256 of the United States Code, adding the name of the said Dirk R. d'Arnaud Gerkens to the patent as a joint inventor, and a showing and proof of facts satisfying the requirements of the said section having been submitted, it is this 8th day of November 1960 certified that the name of the said Dirk R. d'Arnaud Gerkens is hereby added to the said patent as a joint inventor with the said Louis Spieser.

[SEAL]

ARTHUR W. CROCKER,
*First Assistant Commissioner of Patents.*